W. BETZ.
VEHICLE AXLE.
APPLICATION FILED AUG. 5, 1907.
902,852.
Patented Nov. 3, 1908.
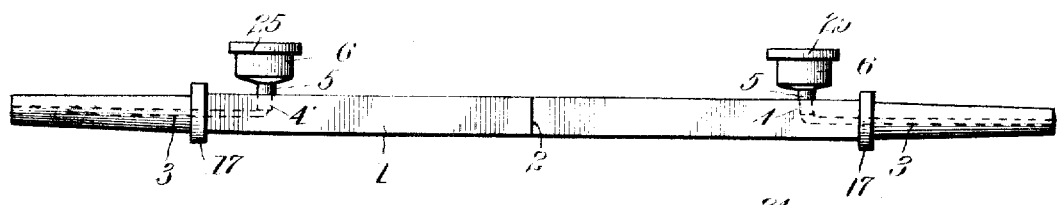
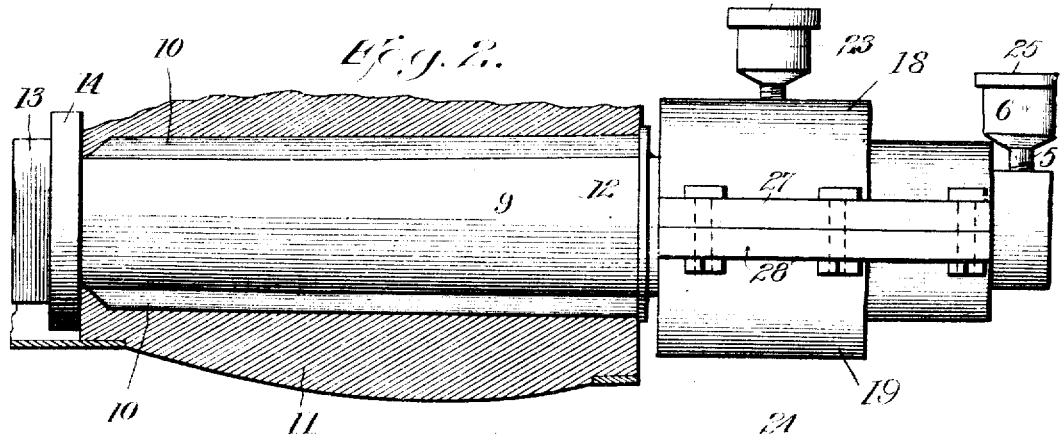
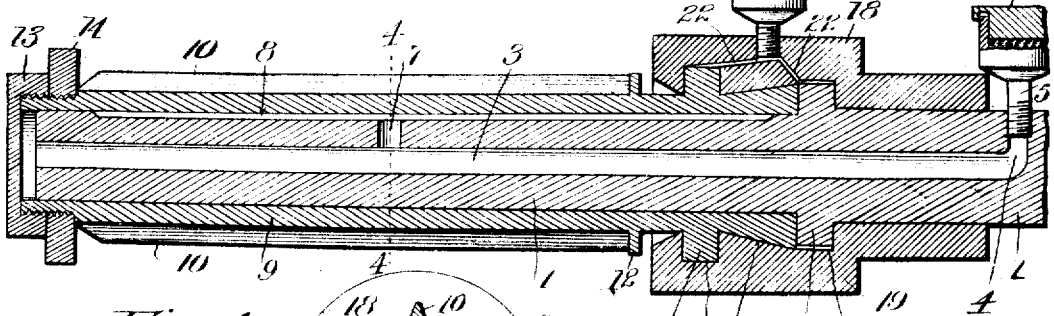
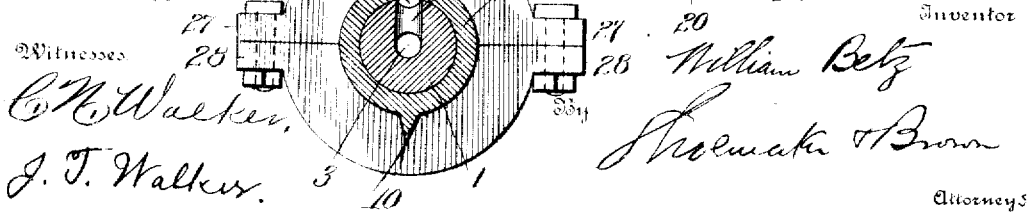
Witnesses
C. N. Walker
J. T. Walker
Inventor
William Betz
Shoemaker & Brown
Attorneys

UNITED STATES PATENT OFFICE.

WILLIAM BETZ, OF WATAGA, ILLINOIS.

VEHICLE-AXLE.

No. 902,852.  Specification of Letters Patent.  Patented Nov. 3, 1908.

Application filed August 5, 1907. Serial No. 387,077.

*To all whom it may concern:*

Be it known that I, WILLIAM BETZ, a citizen of the United States, residing at Wataga, in the county of Knox and State of Illinois, have invented certain new and useful Improvements in Vehicle-Axles, of which the following is a specification.

This invention relates to vehicle axles.

One object of the invention is to provide an axle embodying such characteristics that it may be automatically lubricated.

Another object of the invention resides in the provision of an axle constructed and arranged for coöperation with the hub boxes of the wheels to lock the boxes at their inner ends with the axle and thereby obviate the use of nuts at the outer ends of the axle.

A still further object of the invention is to provide an axle and a boxing for the wheel embodying such characteristics that the axle and boxing may be properly locked together against displacement and to also provide the boxing with ribs or knife edges adapted to bite into the wooden hub of the wheel to interlock the boxing and hub.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details within the scope of the appended claims without departing from the spirit or sacrificing any of the advantages.

In the drawings:—Figure 1 is a side elevation of a vehicle axle constructed in accordance with the improvements. Fig. 2 is a side elevation enlarged, of the journal portion of the axle with the improvements applied, with a portion of the hub in section. Fig. 3 is a longitudinal sectional elevation of the parts shown in Fig. 2. Fig. 4 is a transverse section on the line 4—4 of Fig. 3 looking toward the inner end of the journal, and without the lubricating cup.

Referring now more particularly to the accompanying drawings, the reference character 1 indicates the axle which may be formed of a single piece of suitable material or two pieces welded together, as indicated at 2, the latter forming practically a one piece axle. Each end of the axle is provided with a longitudinal bore 3 terminating short of the middle of the axle and at its inner end directed upwardly as indicated at 4, for the purpose of providing an opening which is preferably screw threaded to receive the screw threaded leg portion 5 of the hard oil cup 6. The bores 3 at each end of the axle open through the outer ends of the axle, and between the ends of each bore is a passage 7 adapted to convey oil, grease or other lubricating material from the corresponding bore 3 to a groove 8 formed in the top of journal portions of the axle at each end thereof, the grooves 8 being adapted to receive lubricant for the efficient lubrication of the boxing 9 of each wheel, each box 9 being provided with two or more ribs or knife edges 10 adapted to bite into the hub 11 of the wheel to prevent accidental slipping of the hubs upon the boxings. The inner end of each hub is disposed against a shoulder 12 on the corresponding box while the outer end of each box projects slightly beyond the corresponding end of the axle with the ribs 10 terminating short of the outer end of the boxings so that the latter may have their outer ends screw threaded to receive the cap nuts 13 which latter may receive lubricating material when applied to the boxing, there being a lock nut 14 arranged between the inner end of each cap nut 13 and the outer end of the hub of the wheel. Thus by simply removing the cap nuts 13, the bores 3 at the corresponding ends of the axle may be readily cleaned. Each of the boxes is provided near its inner end with a collar 15 in spaced relation to the aforesaid shoulder 12, and beyond this collar 15 the inner end of each boxing is preferably flared outwardly, as indicated at 16, the flaring end 16 of each boxing bearing against a collar 17 carried by the axle 1, and reference to Fig. 3 will disclose that the aforesaid grooves 8 of the axle extend nearly to the collar 17 and beyond the collar 15.

The reference characters 18 and 19 indicate clamping members, each of which is semi-circular in cross section and has the interior of its enlarged inner end provided with semi-circular grooves 20 and 21 adapted to fit over the collars 15 and 17, respectively, to interlock the boxings and axle together. Each clamping member is also provided with a formation between its ends to accommodate the flaring part 16 of the corresponding boxing. This flaring part of each boxing and the collars 15 and 17 may be lubricated through the instrumentality of the diverging passage ways 22 in each upper clamping member 18 by means of a hard oil cup 23 provided with a cap 24 adapted to be screwed into the cup 23 to force the lubricant through the passage ways 22 for an efficient lubrication of each boxing with respect to each end of the axle, the lubricant passing through the passage ways 22, finally entering the corresponding grooves 8 in the top of the ends of the axle. The oil cup 23 may be of smaller size than the oil cups 6, as the revolving portion of the boxing requires less lubricating than the journals of the axles, and as each cup receives hard oil or grease, the cup 6 is constructed to receive a cap 25 adapted to perform the same function with respect to the forcing of the lubricant from the cup 6, as is accomplished by the cap 24 with regard to the cup 23.

From the foregoing it will be seen that the connection between the clamping members and the axle may be regarded as a cone bearing and it will also be seen that the clamping members 18 and 19 may be considered in the light of a bisected sleeve whose parts each carry pairs of longitudinal flanges 27 and 28 respectively, whereby the bisected parts of the sleeve may be firmly secured upon the axle and the boxing firmly interlocked with the ends of the axle without in any way interfering with an efficient rotation of the boxings upon the axle. It will also be appreciated that by simply working the caps 24 and 25 of the cups 23 and 6, respectively, the lubricant may be supplied in regulated quantities and when needed. It will also be understood that each end of the axle is of the same formation and that the construction of all of the elements coöperating with the axle is the same at one end thereof as at the opposite end of the axle.

What is claimed is:—

1. The combination with an axle having journals at the ends and with collars at the junctures of the body of the axle and the journals, of hub boxes mounted upon said journals and bearing against said axle collars, each box provided with a collar spaced from its inner end and with the portion between its collar and inner end flaring outwardly, divided clamping members having semi-annular interior channels bearing over the collars of the axle and of the box and with the portions of the members between the channels conforming to and engaging the flaring portions of the boxes, and means for securing the clamping members together.

2. The combination with an axle having journals at the ends and with collars at the juncture of the body of the axle and the journals, of hub boxes mounted upon said journals and bearing against said axle collars, each box threaded at the outer end and provided with a collar spaced from its inner end and with the portion between its collar and inner end flaring outwardly, divided clamping members having semi-annular interior channels bearing over the collars of the axles and of the box and with portions between the channels conforming to and engaging the flaring portion of the boxes, means for securing the clamping members together, and a holding nut engaging the threaded end of the box.

3. The combination with an axle having journals at the ends and with collars at the juncture of the body of the axle and the journals, of hub boxes mounted upon said journals and bearing against said axle collars, each box threaded at the outer end and provided with a collar spaced from its inner end and with the portion between its collar and inner end flaring outwardly, divided clamping members having semi-annular interior channels bearing over the collars of the axles and the box and with portions between the channels conforming to and engaging the flaring portion of the boxes, means for securing the clamping members together, a holding nut engaging the threaded end of the box, and adapted to bear against the hub, and an internally threaded cap engaging the threaded end of the box and bearing against the holding nut and extending over the end of the box and axle journal.

4. An axle box including a body portion having a flaring end, a collar carried by the box, a shoulder carried by the box in spaced relation to the collar, and knife ribs carried by the box.

5. The combination with an axle having a collar, of a box having a flaring inner end engaging said collar, a collar carried by the box, and means overlapping said collars to couple the box to the axle, said means shielding said collars.

6. The combination with an axle having a collar, of a box having a flaring inner end engaging said collar, a collar carried by the box, clamping members engaging said collars to couple the box and axle together, and an oil cup carried by one of said clamping members and adapted to feed oil to said elements.

7. The combination with an axle carrying a collar, of a box carrying a collar between its ends, means overlapping said collars and constructed to couple the collar and box together, the outer end of the box being screw threaded, and a nut adapted for engagement with the screw threads of the box.

In testimony whereof I affix my signature, in presence of two witnesses.

WILLIAM BETZ.

Witnesses:
    CHAS. BROWN,
    J. H. MERRILL.